United States Patent
Ohashi

(10) Patent No.: US 9,866,087 B2
(45) Date of Patent: Jan. 9, 2018

(54) COOLING STRUCTURE FOR COOLING A STATOR CORE OF A ROTATING ELECTRICAL MACHINE AND METHOD OF MANUFACTURING THE COOLING STRUCTURE

(71) Applicant: Mitsubishi Electric Corporation, Tokyo (JP)

(72) Inventor: Naoki Ohashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 298 days.

(21) Appl. No.: 14/662,306

(22) Filed: Mar. 19, 2015

(65) Prior Publication Data
US 2016/0126799 A1 May 5, 2016

(30) Foreign Application Priority Data
Oct. 29, 2014 (JP) .................. 2014-220074

(51) Int. Cl.
*H02K 9/00* (2006.01)
*H02K 5/20* (2006.01)
*H02K 9/19* (2006.01)

(52) U.S. Cl.
CPC ........ *H02K 5/20* (2013.01); *H02K 9/19* (2013.01)

(58) Field of Classification Search
CPC ............ H02K 9/12; H02K 5/20; H02K 15/14; H02K 9/14; H02K 9/16
USPC .................... 310/52, 54, 58, 64, 90
See application file for complete search history.

(56) References Cited

U.S. PATENT DOCUMENTS

| 5,923,108 A * | 7/1999 | Matake ............. H02K 5/128 310/71 |
| 9,054,565 B2 * | 6/2015 | Fulton ............ H02K 5/20 |
| 2008/0185924 A1 * | 8/2008 | Masoudipour ......... H02K 5/20 310/54 |

(Continued)

FOREIGN PATENT DOCUMENTS

| JP | 57062754 A | 4/1982 |
| JP | 63120887 A | 5/1988 |

(Continued)

OTHER PUBLICATIONS

Communication dated Aug. 4, 2015 from the Japanese Patent Office issued in corresponding Japanese application No. 2014220074.

(Continued)

*Primary Examiner* — Hanh Nguyen
(74) *Attorney, Agent, or Firm* — Sughrue Mion, PLLC; Richard C. Turner

(57) ABSTRACT

A cooling structure for cooling a stator core of a rotating electrical machine includes: a stator core (1b) arranged along an outer periphery of a rotor fixed to a rotary shaft (AX) of a rotating electrical machine; a stator frame (2) extending along an outer peripheral surface of the stator core (1b), the stator frame being configured to fix and support the stator core from the outer peripheral surface side thereof; and a motor case (7) having small-diameter end portions on both sides in an axial direction of the rotary shaft (AX), the small-diameter end portions being welded with airtightness onto an outer peripheral surface of the stator frame so that the motor case forms a space, which is the coolant flow path (CC), together with the outer peripheral surface of the stator frame.

11 Claims, 3 Drawing Sheets

(56) References Cited

U.S. PATENT DOCUMENTS

| | | | | |
|---|---|---|---|---|
| 2008/0223557 A1* | 9/2008 | Fulton | ...................... | H02K 5/20 |
| | | | | 165/104.33 |
| 2015/0069862 A1* | 3/2015 | Bulatow | .................. | H02K 5/04 |
| | | | | 310/43 |

FOREIGN PATENT DOCUMENTS

| JP | 06044378 U | 6/1994 |
|---|---|---|
| JP | 6-88170 A | 12/1994 |
| JP | 07067292 A | 3/1995 |
| JP | 090983871 A | 4/1997 |
| JP | 10-52002 A | 2/1998 |
| JP | 2007049850 A | 2/2007 |
| JP | 2009-247085 A | 10/2009 |
| JP | 5136069 B2 | 2/2013 |

OTHER PUBLICATIONS

Communication dated Sep. 27, 2016 from the Japanese Patent Office in counterpart Application No. 2014-220074.

* cited by examiner

COOLING STRUCTURE FOR COOLING A STATOR CORE OF A ROTATING ELECTRICAL MACHINE AND METHOD OF MANUFACTURING THE COOLING STRUCTURE

BACKGROUND OF THE INVENTION

1. Field of the Invention

The present invention relates to a rotating electrical machine, specifically, a cooling structure for cooling a stator core of the rotating electrical machine, and to a method of manufacturing the cooling structure.

2. Description of the Related Art

Hitherto, as a method of cooling a stator core, there is known a method of causing cooling water, oil, or the like to flow between an outer periphery of a tubular member (hereinafter referred to as "stator frame") for holding a stator and a tubular member (hereinafter referred to as "motor case") having an inner diameter with a predetermined space with respect to the outer side of the stator frame. Further, sealing for preventing leakage of cooling water is generally carried out by sandwiching elastic members such as O-rings between an outer peripheral member and an inner peripheral member (for example, see Japanese Patent No. 5136069 and Japanese Patent Application Laid-open No. 2009-247085).

Hitherto, there has been known a structure as described in, for example, Japanese Patent No. 5136069 in which a space is formed between the stator frame for holding the stator core and the motor case for accommodating the stator frame therein, and cooling water is caused to flow therebetween to cool the stator frame. Further, the airtightness of a cooling passage is secured by elastic members (O-rings) arranged with a predetermined distance in a rotary shaft direction of the rotating electrical machine. The elastic members seal the outer periphery of the stator frame and the inner periphery of the motor case around the entire circumference. The O-ring serving as the elastic member extends around the entire circumference of the rotating electrical machine.

In order to secure the airtightness in this structure, the squeeze rate of the O-ring is required to be appropriately managed. Therefore, high accuracy is required in processing of the outer periphery of the stator frame and the inner periphery of the motor case and in assembly of those members, which leads to a high-cost structure in manufacture. Further, when the O-ring, which is generally manufactured through metal molding, increases in size, production efficiency reduces to increase the cost. That is, when the O-ring increases in size, a larger mold is required, and only a single O-ring can be manufactured at once. In particular, when the above-mentioned method is applied to a large-sized motor such as an automobile motor, the cost of the O-ring dramatically increases.

Further, in order to install the O-ring, it is necessary to subject the outer periphery of the stator frame or the inner periphery of the motor case to processing of forming a groove for installing the O-ring. The groove for installing the O-ring requires high accuracy and low surface roughness so as to hold the O-ring and secure the airtightness. In general, machining is carried out. Therefore, processing difficulty is high, which leads to increase in cost.

Further, because the groove for installing the O-ring is required, the stator frame or the motor case requires a thickness that enables the processing. As a result, the weight increases, and further the processing method is limited. Further, processing methods such as sheet metal forming of a thin sheet that can be generally manufactured at low cost and high accuracy through metal component molding cannot be used. In general, a blank is formed through forging and casting, which are difficult to secure accuracy, and most part of the blank is subjected to cutting.

Further, the stator core is press-fitted into the stator frame. The stator frame has high rigidity, and hence the core loss of the stator increases due to the exceeded press-fit force, which eventually causes reduction in motor performance.

SUMMARY OF THE INVENTION

The present invention has been made in order to solve the above-mentioned problems, and has an object to provide a cooling structure for cooling a stator core of a rotating electrical machine and the like, which are capable of improving a function of the rotating electrical machine and exhibiting airtightness in a coolant flow path without requiring an expensive material and advanced technology.

According to one embodiment of the present invention, there are provided a cooling structure and the like for cooling a stator core of a rotating electrical machine, the cooling structure including: a stator core arranged along an outer periphery of a rotor fixed to a rotary shaft of a rotating electrical machine; a stator frame extending along an outer peripheral surface of the stator core, the stator frame being configured to fix and support the stator core from the outer peripheral surface side thereof; and a motor case having small-diameter end portions on both sides in an axial direction of the rotary shaft, the small-diameter end portions being welded with airtightness onto an outer peripheral surface of the stator frame so that the motor case forms a space, which is a coolant flow path, together with the outer peripheral surface of the stator frame.

The present invention provides the cooling structure for cooling a stator core of a rotating electrical machine and the like, which are capable of improving a function of the rotating electrical machine and exhibiting airtightness in the coolant flow path without requiring an expensive material and advanced technology.

DETAILED DESCRIPTION OF THE PREFERRED EMBODIMENTS

Now, a cooling structure for cooling a stator core of a rotating electrical machine according to each embodiment of the present invention is described with reference to the drawings. Note that, in the respective embodiments, the same or corresponding parts are denoted by the same reference symbols, and redundant description is omitted herein.

First Embodiment

Figure 1:
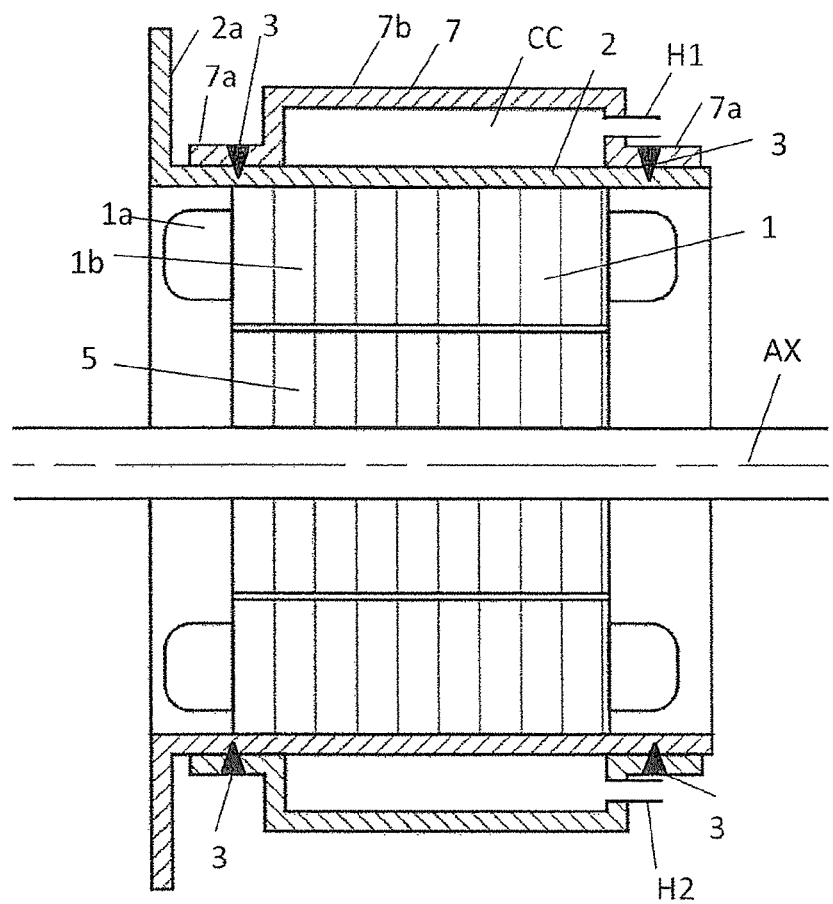
FIG. 1 is a sectional view taken along a rotary shaft direction of a rotating electrical machine in a cooling structure for cooling a stator core of a rotating electrical machine according to a first embodiment of the present invention.

FIG. 1 is a sectional view taken along a rotary shaft direction of a rotating electrical machine in a cooling structure for cooling a stator core of a rotating electrical machine according to a first embodiment of the present invention.

A rotor 5 is fixed to a rotary shaft AX of the rotating electrical machine. The rotary shaft AX is rotatably supported by bearings (not shown) provided at both end sides in an axial direction.

A stator 1 includes a stator core 1b arranged along an outer periphery of the rotor 5 around the entire circumference of the outer periphery, and a stator coil 1a wound around the stator core 1b.

A stator frame 2 extends along an outer peripheral surface of the stator core 1b around the entire circumference, to thereby fix and support the stator core 1b from the outer peripheral surface side. The stator frame 2 is an iron cylindrical frame formed through thin sheet forming, for example. The stator frame 2 includes a flange portion 2a extending outward in a radial direction of the rotating electrical machine.

A motor case 7 is arranged on an outer periphery of the stator frame 2 around the entire circumference. The motor case 7 is an iron cylindrical case formed through thin sheet forming, for example, for accommodating the stator frame 2 therein. The motor case 7 forms, together with an outer peripheral surface of the stator frame 2, a space being a coolant flow path CC for cooling. In the motor case 7, each of both end sides in the axial direction of the rotary shaft AX has a smaller diameter than the diameter of a center part, and both the end sides are brought in proximity or close contact with the outer peripheral surface of the stator frame 2. The motor case 7 includes, as illustrated in FIG. 1 as an example, a protruded flow path portion 7b formed in the center part in the axial direction of the rotary shaft AX, and flange portions 7a formed on both sides of the flow path portion 7b. The flow path portion 7b forms, together with the outer peripheral surface of the stator frame 2, the coolant flow path CC extending along the outer periphery of the stator frame 2. The flange portions 7a are brought in proximity or close contact with the stator frame 2. Further, the motor case 7 includes supply and discharge ports H1 and H2 for supplying and discharging a coolant such as cooling water, oil, and a cooling material to and from the coolant flow path CC. The stator core 1b is cooled by passing the coolant through the coolant flow path CC.

The stator core 1b is held inside the stator frame 2 through press-fitting or shrink-fitting, for example.

In the motor case 7, both the end sides in the axial direction of the rotary shaft AX, for example, the parts of the flange portions 7a are each subjected to welding 3 with airtightness onto the outer peripheral surface of the stator frame 2 around the entire circumference so that the motor case 7 forms, together with the outer peripheral surface of the stator frame 2, the coolant flow path CC that is secured in airtightness.

Note that, the motor case 7 is not always required to have a structure including the protruded flow path portion 7b and the flange portions 7a on both sides thereof as illustrated in FIG. 1. The motor case 7 is only required to include a part for forming the coolant flow path CC, and small-diameter end portions formed on both sides thereof and each welded onto the outer peripheral surface of the stator frame 2 around the entire circumference so as to secure the airtightness of the coolant flow path CC. Further, the motor case 7 may have a shape in which a plurality of coolant flow paths CC are formed along the outer periphery.

Further, the method of manufacturing the stator frame 2 and the motor case 7 is not limited to thin sheet forming. Further, the stator frame 2 and the motor case 7 may not be made of an iron material.

With the cooling structure for cooling a stator core constructed as described above, the following effects can be obtained.

An additional sealing member such as an O-ring is unnecessary, and hence the material cost can be reduced.

Processing of a groove for holding the O-ring is unnecessary, and hence the processing cost for forming a groove, which requires processing with high accuracy to secure the airtightness, is unnecessary, which enables reduction in cost.

The stator frame 2 and motor case 7 made of a thin material can be employed, and hence thin sheet forming is possible, which enables reduction in component processing cost and weight.

The rigidity of the stator frame 2 is reduced because the stator frame 2 is made of a thin material, and hence the press-fitting force is reduced. Thus, the force that the stator frame 2 fastens the stator core 1b can be reduced, which eventually reduces the core loss of the stator.

Second Embodiment

Figure 2:
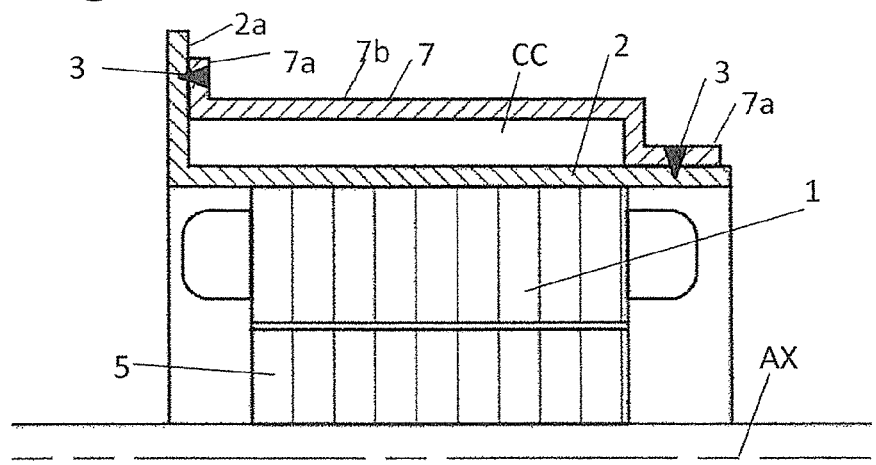
FIG. 2 is an upper half sectional view taken along a rotary shaft direction of a rotating electrical machine in a cooling structure for cooling a stator core of a rotating electrical machine according to a second embodiment of the present invention.

FIG. 2 is an upper half sectional view taken along a rotary shaft direction of a rotating electrical machine in a cooling structure for cooling a stator core of a rotating electrical machine according to a second embodiment of the present invention. Note that, the lower half sectional view is basically line-symmetric to the upper half sectional view with respect to the rotary shaft AX, and hence the second and subsequent embodiments are represented by the upper half sectional view. Further, illustration of the supply and discharge ports H1 and H2 is omitted.

The cooling structure for cooling a stator core of FIG. 2 is a modified example of FIG. 1 in which one end of the stator frame 2 of FIG. 1 is formed into a flange shape, and a flange-shaped part is welded and sealed (welded around the entire circumference) to the flange part of the motor case 7.

That is, the stator frame 2 includes, at an end portion on one of both sides in the axial direction of the rotary shaft AX, the flange portion 2a protruding outward in the radial direction of the rotating electrical machine. The motor case 7 includes, at an end portion of the same side as the flange portion 2a in the axial direction of the rotary shaft AX, the flange portion 7a protruding outward in the radial direction (flange portion on the left side in FIG. 2). Then, the flange portion 2a and the flange portion 7a are subjected to welding 3 around the entire circumference so that a joined surface is directed in the axial direction of the rotary shaft AX.

With the cooling structure for cooling a stator core constructed as described above, the following effects can be obtained.

As compared to the case where both the ends of the motor case 7 are smaller in diameter than the center portion thereof as in the case of FIG. 1, the manufacture is possible through pressing and the like, and the manufacture is more facilitated, which enables reduction in cost.

In the structure of FIG. 1, the two welding portions (for example, the flange portions 7a) require accuracy in the radial direction of rotating electrical machine, and alignment in the axial direction of the rotary shaft AX. In contrast, in the structure of FIG. 2, only one of the two welding portions requires the accuracy in the radial direction, which facilitates the manufacture. That is, the airtightness can be secured only by pressing the flange portion 7a and the flange portion 2a, which are protruding outward in the radial direction, to each other, and the welding may be carried out thereafter.

As compared to the structure of FIG. 1, only one part is required to be welded on the peripheral surface of the stator frame 2, and hence the coolant flow path CC can be enlarged, which eventually improves the cooling effect.

Third Embodiment

Figure 3:
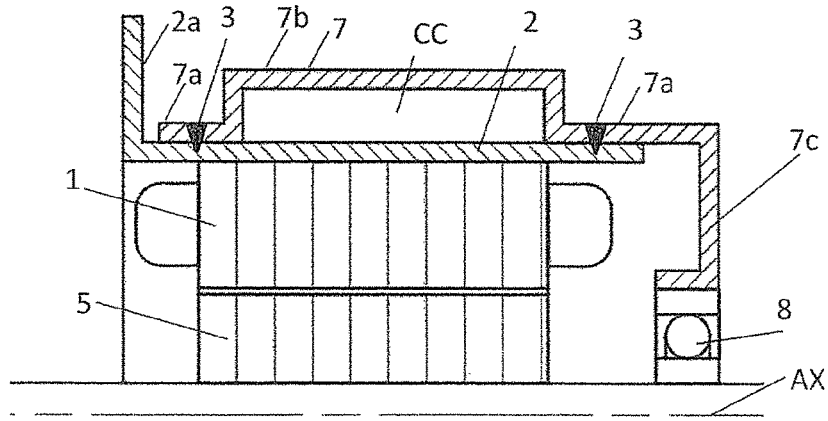
FIG. 3 is an upper half sectional view taken along a rotary shaft direction of a rotating electrical machine in a cooling structure for cooling a stator core of a rotating electrical machine according to a third embodiment of the present invention.

FIG. 3 is an upper half sectional view taken along a rotary shaft direction of a rotating electrical machine in a cooling structure for cooling a stator core of a rotating electrical machine according to a third embodiment of the present invention. The cooling structure for cooling a stator core of FIG. 3 is a modified example of FIGS. 1 and 2 in which one end portion of the motor case 7 in the first and second embodiments is formed as an extending portion 7c extending inward in the radial direction, and a bearing 8 is held by the extending portion 7c. Note that, the component to be held is not limited to the bearing, and may be, for example, a rotation detector or the like.

That is, in the case of the cooling structure for cooling a stator core of FIG. 1, as illustrated in FIG. 3, the motor case 7 includes, at an end portion (flange portion 7a) on one of both the sides in the axial direction of the rotary shaft AX, the extending portion 7c extending inward in the radial direction, and the bearing portion or a rotation detector 8 for the rotary shaft AX, which is provided at an end of the extending portion 7c.

Figure 6:
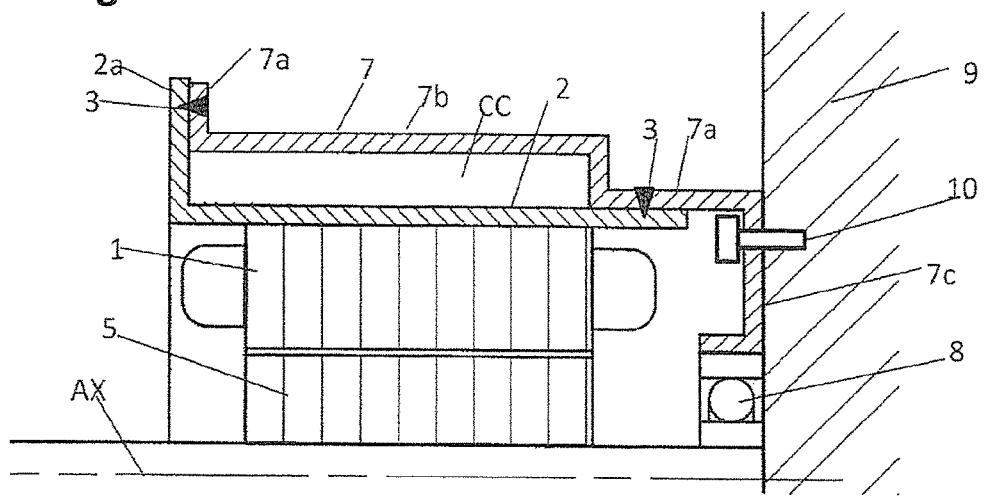
FIG. 6 is an upper half sectional view taken along a rotary shaft direction of a rotating electrical machine in a modified example of the cooling structure for cooling a stator core of a rotating electrical machine according to each of the third and fourth embodiments of the present invention.

Further, in the case of the cooling structure for cooling a stator core of FIG. 2, for example, as illustrated in FIG. 6, the motor case 7 includes, at the edge of the end portion (flange portion 7a) on the opposite side to the flange portion 7a extending outward in the radial direction, the extending portion 7c extending inward in the radial direction, and the bearing portion or the rotation detector 8 for the rotary shaft AX, which is provided at an end of the extending portion 7c.

With this, the motor case 7 may have a function of not only cooling but also supporting a rotator or fixing the rotation detector, which enables reduction in cost and weight due to functional integration (component unification).

Fourth Embodiment

Figure 4:
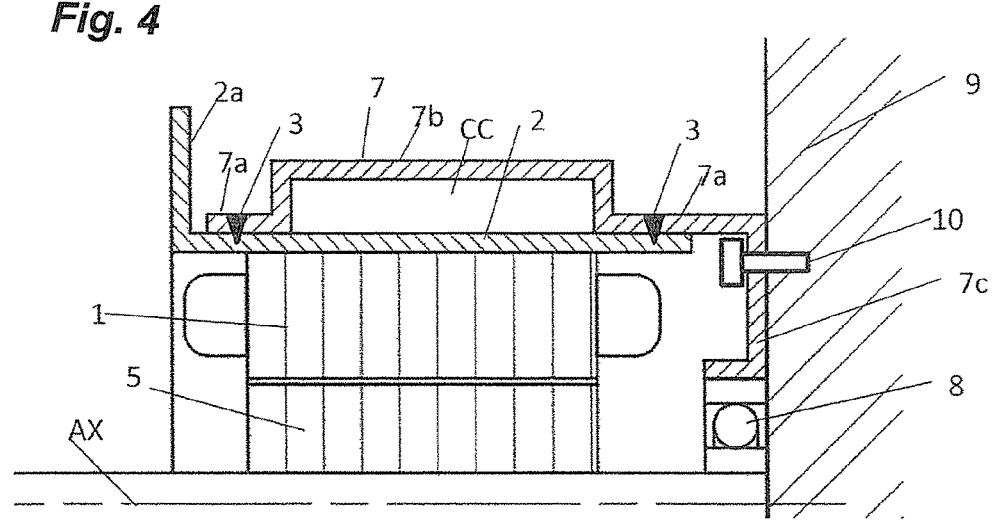
FIG. 4 is an upper half sectional view taken along a rotary shaft direction of a rotating electrical machine in a cooling structure for cooling a stator core of a rotating electrical machine according to a fourth embodiment of the present invention.

FIG. 4 is an upper half sectional view taken along a rotary shaft direction of a rotating electrical machine in a cooling structure for cooling a stator core of a rotating electrical machine according to a fourth embodiment of the present invention. The cooling structure for cooling a stator core of FIG. 4 is a modified example of FIG. 3, and uses the extending portion 7c of the motor case 7 of FIG. 3 to fix the extending portion 7c to a rotating electrical machine holding member 9 with, for example, a screw 10 being a fixing member.

Further, in the case of the cooling structure for cooling a stator core of FIG. 2, as illustrated in FIG. 6, the extending portion 7c at the end portion on the opposite side to the flange portion 7a extending outward in the radial direction of the motor case 7 is fixed to the rotating electrical machine holding member 9 with the screw 10.

Figure 7:
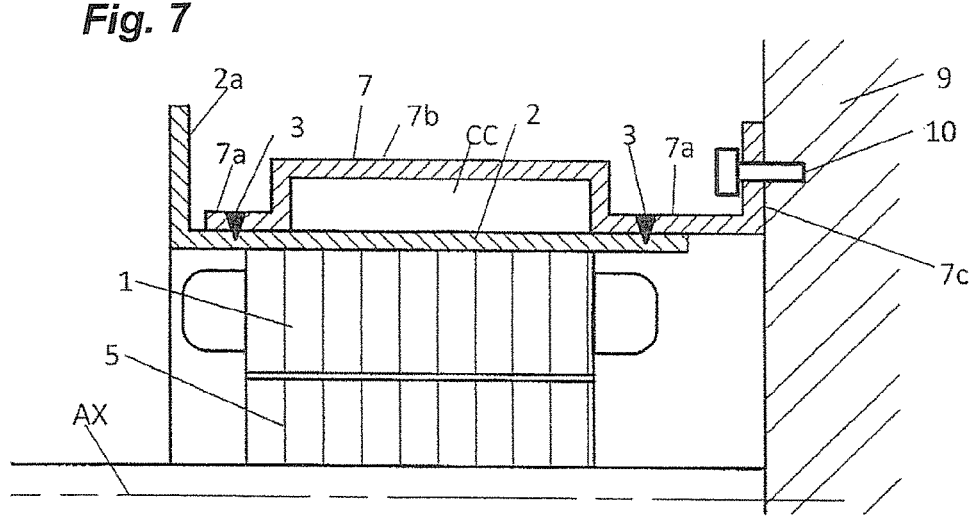
FIG. 7 is an upper half sectional view taken along a rotary shaft direction of a rotating electrical machine in a modified example of the cooling structure for cooling a stator core of a rotating electrical machine according to the fourth embodiment of the present invention.

Note that, the extending portion 7c is not limited to be extended inward in the radial direction, and may be extended outward in the radial direction as illustrated in FIG. 7, for example. In this case, the extending portion 7c is fixed to the rotating electrical machine holding member 9 with the screw 10, but the bearing portion or the rotation detector 8 is omitted. Also in the case of the cooling structure for cooling a stator core of FIGS. 4 and 6, the bearing portion or the rotation detector 8 may be omitted.

Further, the fixing to the rotating electrical machine holding member 9 is not limited to screw fixing, and another anchor such as a nail, an adhesive, or the like may be employed.

With this, a function of fixing the rotating electrical machine may be further added to the function of the motor case 7, which enables reduction in cost and weight due to functional integration (component unification).

Fifth Embodiment

Figure 5:
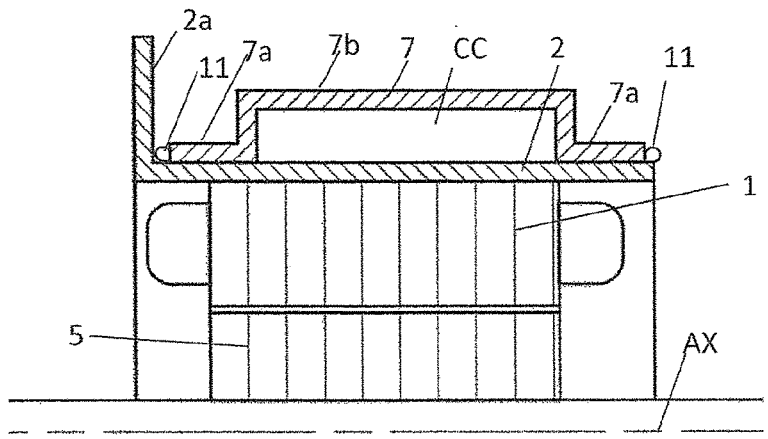
FIG. 5 is an upper half sectional view taken along a rotary shaft direction of a rotating electrical machine in a cooling structure for cooling a stator core of a rotating electrical machine according to a fifth embodiment of the present invention.

FIG. 5 is an upper half sectional view taken along a rotary shaft direction of a rotating electrical machine in a cooling structure for cooling a stator core of a rotating electrical machine according to a fifth embodiment of the present invention. In each of the above-mentioned embodiments, the motor case 7 is fixed to the stator frame 2 through welding with airtightness, such as entire circumference welding. In the cooling structure for cooling a stator core of FIG. 5, the motor case 7 is fixed to the stator frame 2 through press-fitting or shrink-fitting, and the airtightness is secured by applying a resin member 11 to an outer end of the fitted portion.

Alternatively, the motor case 7 is welded to the stator frame 2 through welding without airtightness, such as resistance welding, and the airtightness is secured by applying the resin member 11 to an outer end of the joined portion.

Note that, in this case, the fixing of the motor case 7 to the stator frame 2 is not limited to press-fitting or shrink-fitting, and each of the press-fitting and shrink-fitting may be combined with welding with airtightness such as entire circumference welding.

With the cooling structure for cooling a stator core constructed as described above, the following effects can be obtained.

Welding with high accuracy and airtightness is unnecessary. When the airtightness is to be secured, in general, it is necessary to use expensive welding equipment, such as laser welding. With the above-mentioned structure, however, the motor case 7 can be fixed to the stator frame 2 through resistance welding, press-fitting, or shrink-fitting, which leads to reduction in cost.

Further, combination with welding with airtightness leads to backup of the welding with airtightness, which improves the reliability.

Note that, the present invention is not limited to the above-mentioned embodiments, and encompasses all of the possible combinations of the embodiments.

What is claimed is:

1. A cooling structure for cooling a stator core of a rotating electrical machine, the cooling structure comprising:
   a stator core arranged along an outer periphery of a rotor fixed to a rotary shaft of a rotating electrical machine;
   a stator frame extending along an outer peripheral surface of the stator core, the stator frame being configured to fix and support the stator core from the outer peripheral surface side thereof; and
   a motor case having a small-diameter end portion on one side in an axial direction of the rotary shaft, the small-diameter end portion being welded with airtightness onto an outer peripheral surface of the stator frame so that the motor case forms a space, which is a coolant flow path, together with the outer peripheral surface of the stator frame,
   wherein the stator frame comprises, at an end portion on another side in the axial direction of the rotary shaft, a flange portion protruding outward in a radial direction of the rotating electrical machine,
   wherein the motor case comprises, at an end portion on the one side in the axial direction of the rotary shaft, a flange portion protruding outward in the radial direction, and
   wherein the flange portion of the stator frame and the flange portion of the motor case are welded to each other with airtightness so that a joined surface is directed in the axial direction of the rotary shaft.

2. The cooling structure for cooling a stator core of a rotating electrical machine according to claim 1, wherein the motor case comprises:
   an extending portion formed at an end portion on another of both the sides in the axial direction of the rotary shaft, the extending portion extending inward in the radial direction; and
   one of a bearing portion and a rotation detector for the rotary shaft, which is provided at an end of the extending portion.

3. The cooling structure for cooling a stator core of a rotating electrical machine according to claim 2, wherein the extending portion is fixed to a rotating electrical machine supporting member with a fixing member.

4. The cooling structure for cooling a stator core of a rotating electrical machine according to claim 1,
   wherein the motor case comprises, at an end portion on another of both the sides in the axial direction of the rotary shaft, an extending portion extending one of inward and outward in the radial direction of the rotating electrical machine, and
   wherein the extending portion is fixed to a rotating electrical machine supporting member with a fixing member.

5. The cooling structure for cooling a stator core of a rotating electrical machine according to claim 1, wherein, instead of welding the motor case to the stator frame with airtightness, the motor case is one of press-fitted and shrink-fitted to the stator frame, and a resin member is provided to an outer end of a fitted portion so as to secure airtightness of the coolant flow path.

6. The cooling structure for cooling a stator core of a rotating electrical machine according to claim 1, wherein, instead of welding the motor case to the stator frame with airtightness, the motor case is fixed to the stator frame through welding without airtightness, and a resin member is provided to an outer end of a joined portion so as to secure airtightness of the coolant flow path.

7. A cooling structure for cooling a stator core of a rotating electrical machine, the cooling structure comprising:
   a stator core arranged along an outer periphery of a rotor fixed to a rotary shaft of a rotating electrical machine;
   a stator frame extending along an outer peripheral surface of the stator core, the stator frame being configured to fix and support the stator core from the outer peripheral surface side thereof and
   a motor case having small-diameter end portions on both sides in an axial direction of the rotary shaft, the small-diameter end portions being welded with airtightness onto an outer peripheral surface of the stator frame so that the motor case forms a space, which is a coolant flow path, together with the outer peripheral surface of the stator frame
   wherein the motor case comprises:
   an extending portion formed at an end portion on one of both sides in the axial direction of the rotary shaft, the extending portion extending inward in a radial direction of the rotating electrical machine; and
   one of a bearing portion and a rotation detector for the rotary shaft, which is provided at an end of the extending portion.

8. The cooling structure for cooling a stator core of a rotating electrical machine according to claim 7, wherein the extending portion is fixed to a rotating electrical machine supporting member with a fixing member.

9. A cooling structure for cooling a stator core of a rotating electrical machine, the cooling structure comprising:
   a stator core arranged along an outer periphery of a rotor fixed to a rotary shaft of a rotating electrical machine;
   a stator frame extending along an outer peripheral surface of the stator core, the stator frame being configured to fix and support the stator core from the outer peripheral surface side thereof and
   a motor case having small-diameter end portions on both sides in an axial direction of the rotary shaft, the small-diameter end portions being welded with airtightness onto an outer peripheral surface of the stator frame so that the motor case forms a space, which is a coolant flow path, together with the outer peripheral surface of the stator frame
   wherein the motor case comprises:
   a flow path portion extending along an outer periphery of the stator frame, the flow path portion being configured to form the coolant flow path together with the outer peripheral surface of the stator frame; and
   flange portions formed at both ends of the flow path portion in the axial direction of the rotary shaft, the flange portions being welded to the stator frame
   an extending portion formed at an end portion on one of both sides in the axial direction of the rotary shaft, the extending portion extending inward in a radial direction of the rotating electrical machine; and
   one of a bearing portion and a rotation detector for the rotary shaft, which is provided at an end of the extending portion.

10. The cooling structure for cooling a stator core of a rotating electrical machine according to claim 9, wherein the extending portion is fixed to a rotating electrical machine supporting member with a fixing member.

11. A cooling structure for cooling a stator core of a rotating electrical machine, the cooling structure comprising:
    a stator core arranged along an outer periphery of a rotor fixed to a rotary shaft of a rotating electrical machine;

a stator frame extending along an outer peripheral surface of the stator core, the stator frame being configured to fix and support the stator core from the outer peripheral surface side thereof; and a motor case having small-diameter end portions on both sides in an axial direction of the rotary shaft, the small-diameter end portions being welded with airtightness onto an outer peripheral surface of the stator frame so that the motor case forms a space, which is a coolant flow path, together with the outer peripheral surface of the stator frame, wherein the motor case comprises, at an end portion on side in the axial direction of the rotary shaft, an extending portion extending inward in a radial direction of the rotating electrical machine, and wherein the extending portion is fixed to a rotating electrical machine supporting member with a fixing member.

\* \* \* \* \*